(12) United States Patent
Sato

(10) Patent No.: US 6,879,293 B2
(45) Date of Patent: Apr. 12, 2005

(54) ANTENNA DEVICE AND ELECTRIC APPLIANCE USING THE SAME

(75) Inventor: Masahide Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 54 days.

(21) Appl. No.: 10/371,201

(22) Filed: Feb. 24, 2003

(65) Prior Publication Data

US 2004/0051670 A1 Mar. 18, 2004

(30) Foreign Application Priority Data

Feb. 25, 2002 (JP) ........................................ 2002-047534

(51) Int. Cl.[7] ................................................ H01Q 1/24
(52) U.S. Cl. ............................... 343/702; 343/700 MS; 343/767; 343/841
(58) Field of Search ....................... 343/702, 700 MS, 343/767, 770, 841, 815, 833, 834; 455/90.3

(56) References Cited

U.S. PATENT DOCUMENTS

| | | | |
|---|---|---|---|
| 5,373,300 A | | 12/1994 | Jenness et al. .............. 343/702 |
| 5,677,698 A | * | 10/1997 | Snowdon .................... 343/770 |
| 5,966,098 A | * | 10/1999 | Qi et al. ...................... 343/702 |
| 6,031,497 A | | 2/2000 | Nam .......................... 343/702 |
| 6,181,284 B1 | * | 1/2001 | Madsen et al. ............. 343/702 |
| 6,285,328 B1 | * | 9/2001 | Masaki et al. .............. 343/702 |
| 6,339,400 B1 | * | 1/2002 | Flint et al. .................. 343/702 |
| 6,424,303 B1 | * | 7/2002 | Tsai ........................... 343/702 |
| 6,509,877 B2 | * | 1/2003 | Masaki ....................... 343/702 |
| 6,628,236 B2 | * | 9/2003 | Kim et al. .................. 343/702 |
| 6,636,181 B2 | * | 10/2003 | Asano et al. ............... 343/702 |
| 6,707,431 B2 | * | 3/2004 | Byun et al. ................. 343/702 |

FOREIGN PATENT DOCUMENTS

| | | |
|---|---|---|
| JP | 08-078931 | 3/1996 |
| JP | 10-322355 | 12/1998 |

* cited by examiner

*Primary Examiner*—Tan Ho
(74) *Attorney, Agent, or Firm*—McGinn & Gibb, PLLC

(57) ABSTRACT

In an antenna device, an antenna element incorporated in a housing provided with a display unit is omnidirectional. An antenna device comprises a housing for allowing a display unit for displaying visual information to be disposed on the principal surface $F_1$, and an antenna element incorporated in the housing for radiating a radio wave from an end face $F_2$ contacting with the principal surface $F_1$ of the housing.

40 Claims, 16 Drawing Sheets

ANTENNA DEVICE AND ELECTRIC APPLIANCE USING THE SAME

BACKGROUND OF THE INVENTION

The present invention relates to an antenna device and an electric appliance using the same.

Today, electric appliances such as personal computers are mostly provided with communication functions for connecting to commercial networks or building up a LAN. As communication formats, needs for wireless communications are rapidly increasing owing to various conveniences because cables are not needed unlike wired communications.

An example of an antenna device incorporated in a conventional personal computer is shown in FIG. 27.

In FIG. 27, a personal computer 111 comprises a main body side housing 112 accommodating a keyboard and various electric components, and a display side housing 113 including a display unit 122 for displaying visual information by electric means.

An antenna element 117 is built in a side part of the display side housing 113, and electric power of specified frequency is supplied from a current feeding unit 120 provided in the main body side housing 112 through a coaxial cable 121.

The antenna element may be also located in other positions, such as both sides or center at the upper portion of the display side housing, both sides at the lower portion of the display unit, or both sides of the keyboard in the main body side housing.

Herein, the personal computer 111 is provided with an electromagnetic shield 123 in the display unit 122 or back side of the display side housing 113 in order to shield undesired radiation from the internal electric circuits. In the wide screen trend of the display unit 122, the majority of the space of one side of the display side housing 113 is occupied by the display unit 122.

Therefore, the radio wave from the antenna element 117 incorporated in the display side housing 113 is radiated, as shown in FIG. 28, from the region partially free from the electromagnetic shield 123 at the back side of housing 113. Accordingly, the radiation directivity of the antenna element 117 is unidirectional having an intensity in one direction only.

In a wireless LAN composed by computers, generally, the radiation partners of communication is not fixed in one direction only, and the radiation characteristic of the antenna element is preferred to be uniform as far as possible, that is, omnidirectional.

In the prior art, however, the incorporated antenna element is unidirectional, and communication troubles often occur and comfortable environments of use may not be offered.

SUMMARY OF THE INVENTION

It is hence an object of the invention to present an antenna device having a omnidirectional antenna element incorporated in a housing of a display unit, and an electric appliance using the same.

One of the features of the invention to present, the antenna device of the invention comprises a housing for allowing a display unit for displaying visual information to be disposed on the principal surface, an antenna element incorporated in the housing for radiating a radio wave from a surface including the end face contacting with the principal surface of the housing or the edge of the end face, and an RF module unit that provide electric power on specified frequency spectrum to the antenna element. Since effects of shielding by the electromagnetic shield are avoided by radiating the radio wave from the surface including the end face of the housing or the edge of the end face, the antenna element incorporated in the housing provided with the display unit is omnidirectional.

In a preferred embodiment of the invention, the antenna element radiates the radio wave from the surface including at least either the end face positioned above the housing or the end face positioned sideways, or the edge of the end face of at least either the end face positioned above the housing or the end face positioned sideways. As a result, the antenna element incorporated in the housing provided with the display unit can be omnidirectional.

In a preferred embodiment of the invention, the antenna element is a slot antenna for radiating the radio wave from an opening or insulating region formed in the surface including the end face of the housing surrounded by a conductor region or the edge of the end face. As a result, the antenna element incorporated in the housing provided with the display unit can be omnidirectional.

In a preferred embodiment of the invention, the conductor region is shared with an electromagnetic shield region of the housing for shielding undesired radiation from the electric circuits. As a result, the antenna radiation pattern incorporated in the housing provided with the display unit can be omnidirectional.

In a preferred embodiment of the invention, the opening is closed by an insulating member. As a result, the antenna element incorporated in the housing provided with the display unit can be omnidirectional, and also intrusion of dust into the inside of the appliance can be prevented.

In a preferred embodiment of the invention, the antenna element is a slot antenna installed inside of the housing. As a result, the antenna element incorporated in the housing provided with the display unit can be omnidirectional.

In a preferred embodiment of the invention, the antenna element is a micro strip antenna installed in the surface including the end face of the housing, the edge of the end face or the inside of the housing. As a result, the antenna element incorporated in the housing provided with the display unit can be omnidirectional.

In a preferred embodiment of the invention, the antenna element is an inverted F-type antenna or monopole antenna installed inside of the housing. As a result, the antenna element incorporated in the housing provided with the display unit can be omnidirectional.

The electric appliance of the invention has a wireless communication function, and uses the antenna device described above. Thus, since effects of shielding by the electromagnetic shield are avoided by radiating the radio wave from the surface including the end face of the housing or the edge of the end face, the antenna element incorporated in the housing provided with the display unit can omnidirectional.

DETAILED DESCRIPTION OF THE PREFERRED EMBODIMENTS

Figure 1:
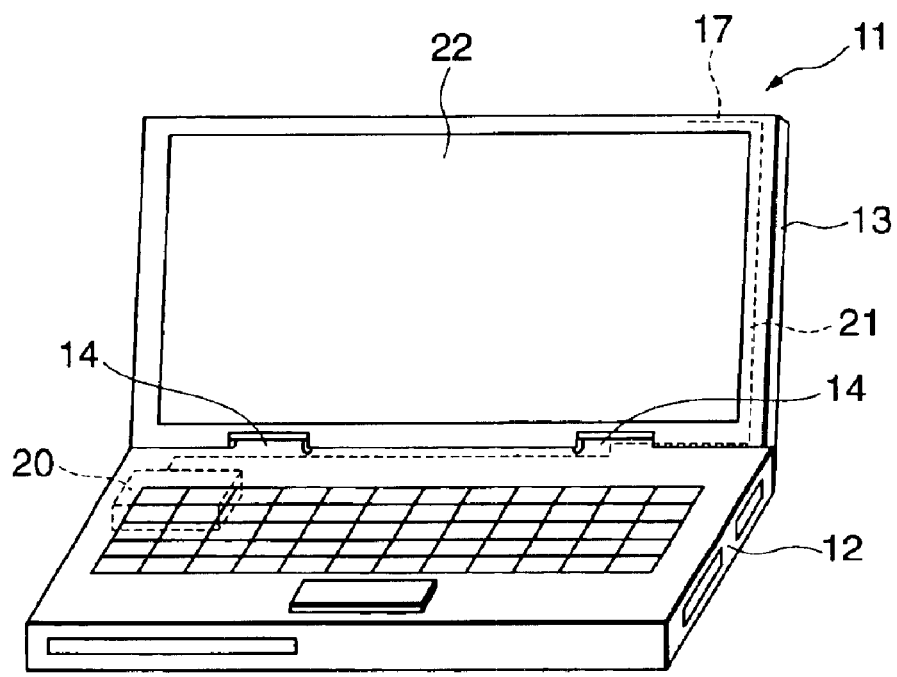
FIG. 1 is a perspective view showing a personal computer using an antenna device in an embodiment of the invention.

Preferred embodiments of the invention are specifically described below by referring to the drawings. In the accompanying drawings, same reference numerals are given to same members, and duplicate explanation is omitted. The embodiments of the invention are particularly useful examples, and the invention is not limited to the illustrated embodiments alone.

Figure 2:
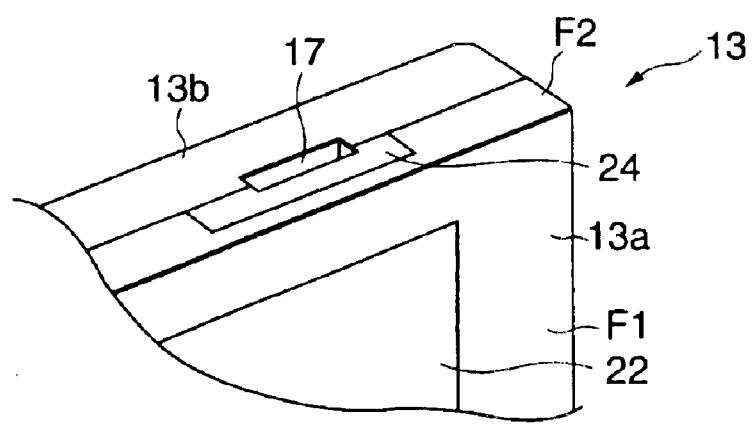
FIG. 2 is a perspective view showing essential parts of the antenna device disposed in the personal computer in FIG. 1.
Figure 3:
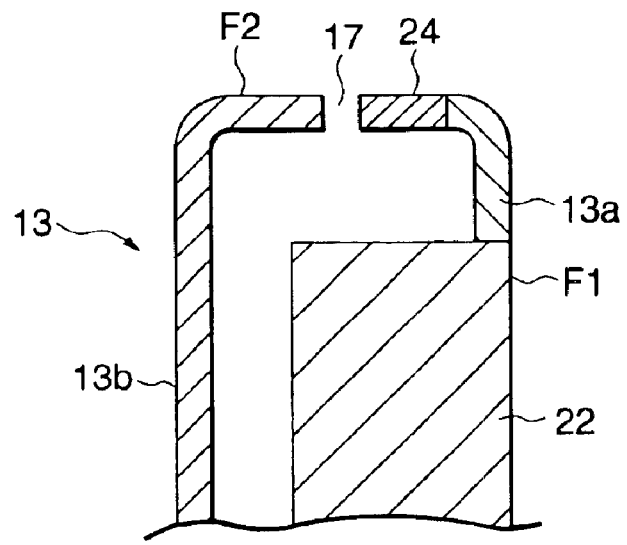
FIG. 3 is a sectional view of FIG. 2.
Figure 4:
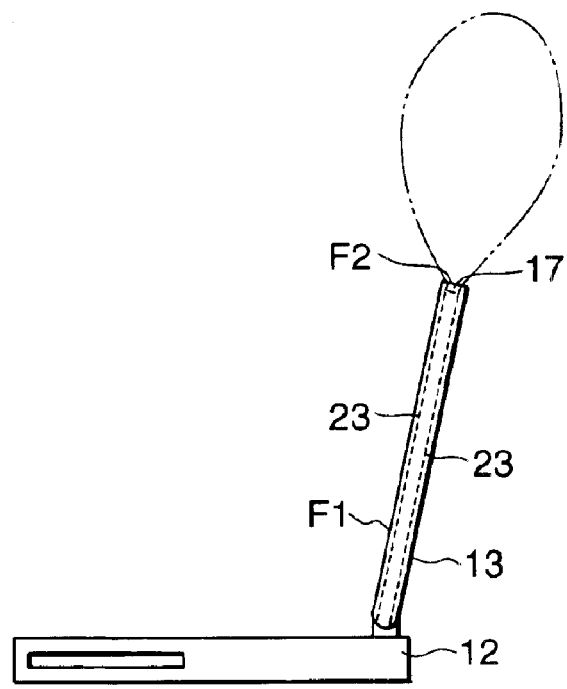
FIG. 4 is an explanatory diagram showing radiation direction of a radio wave by an antenna element disposed in the personal computer in FIG. 1.
Figure 5:
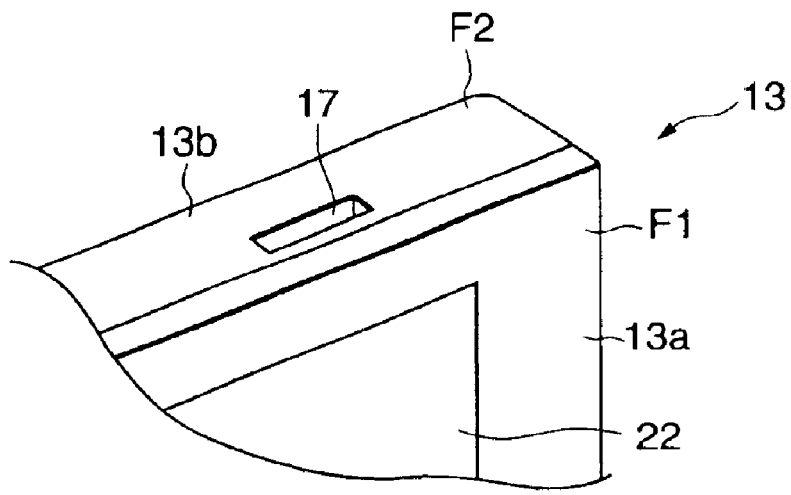
FIG. 5 is a perspective view showing essential parts of an antenna device in other embodiments of the invention.
Figure 6:
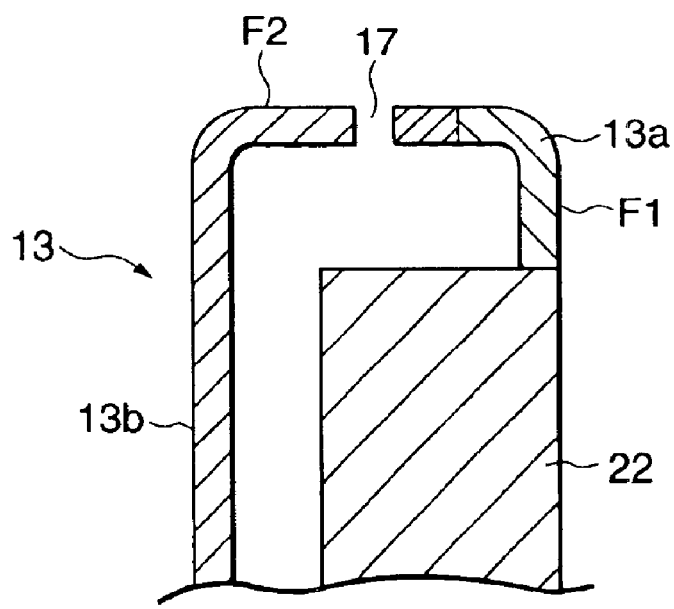
FIG. 6 is a sectional view of FIG. 5.
Figure 7:
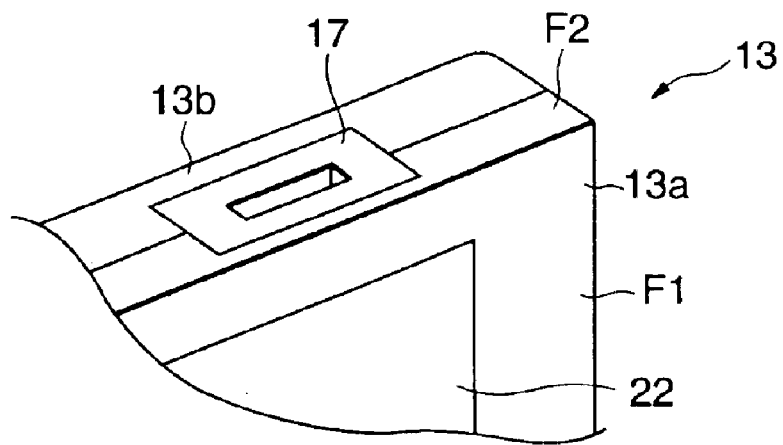
FIG. 7 is a perspective view showing essential parts of an antenna device in a further different embodiment of the invention.
Figure 8:
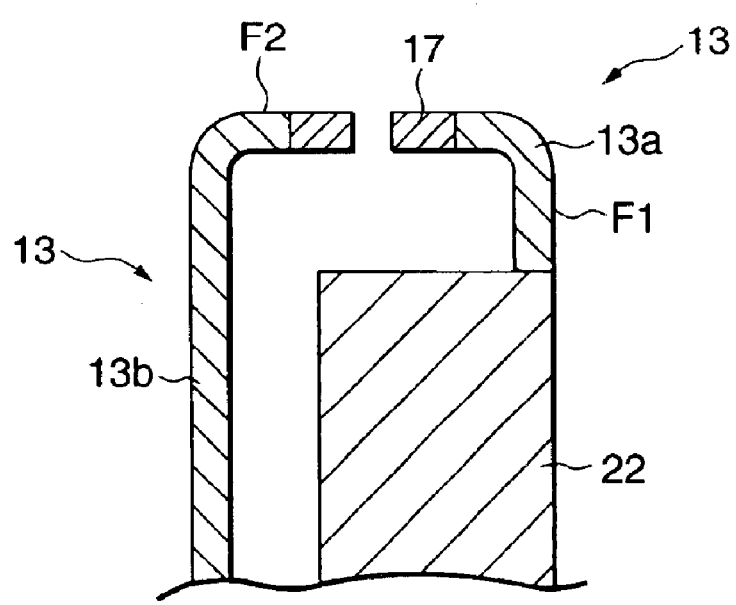
FIG. 8 is a sectional view of FIG. 7.
Figure 9:
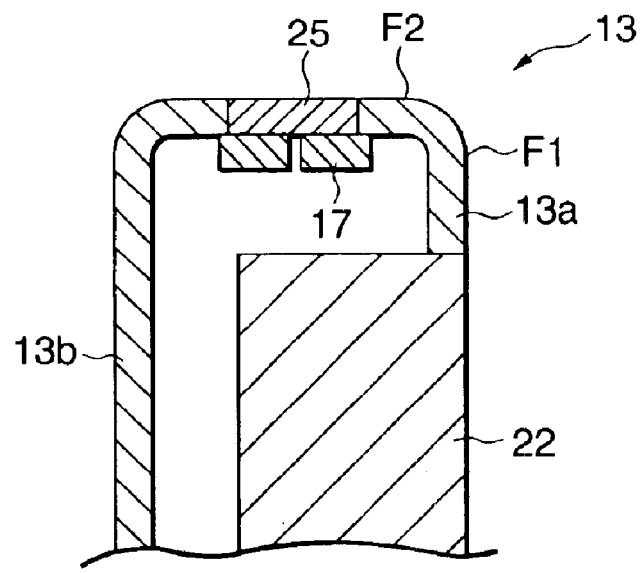
FIG. 9 is a sectional view showing essential parts of an antenna device in other different embodiment of the invention.
Figure 10:
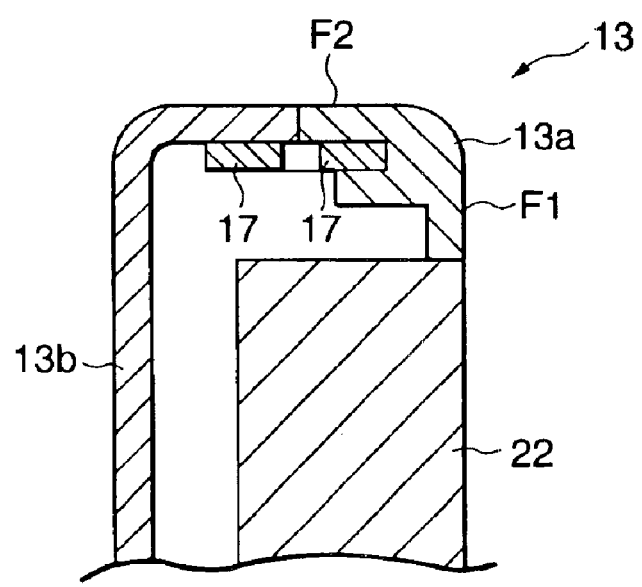
FIG. 10 is a sectional view showing essential parts of an antenna device in a further different embodiment of the invention.
Figure 11:
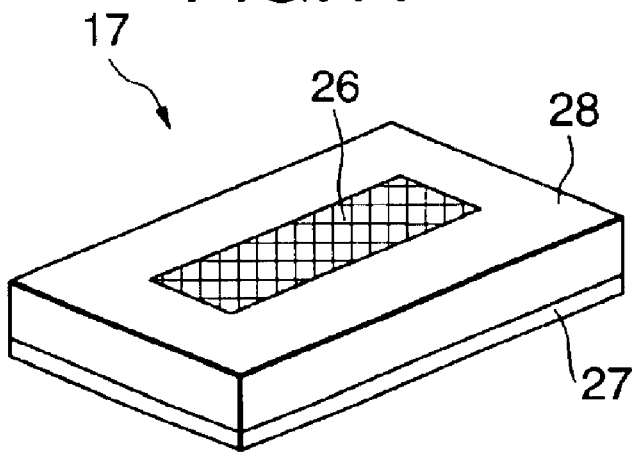
FIG. 11 is a perspective view of an antenna element used in an antenna device in a further different embodiment of the invention.
Figure 12:
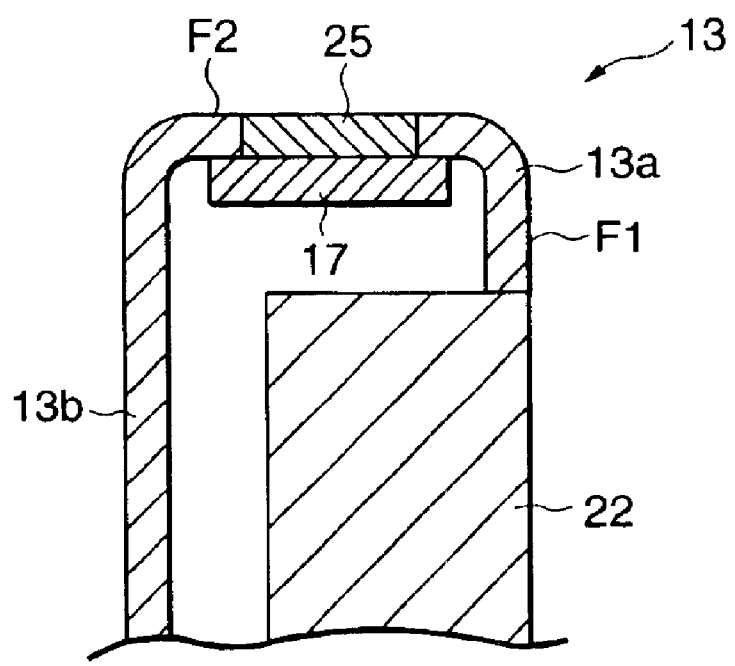
FIG. 12 is a sectional view showing essential parts of the antenna device having the antenna element in FIG. 11.
Figure 13:
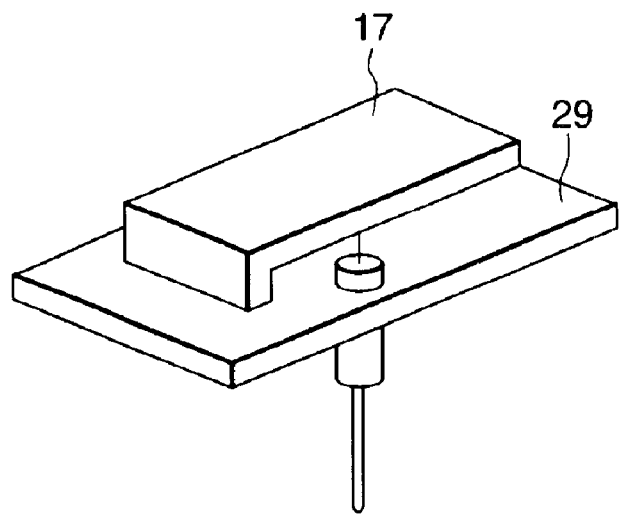
FIG. 13 is a perspective view of an antenna element used in an antenna device in a further different embodiment of the invention.
Figure 14:
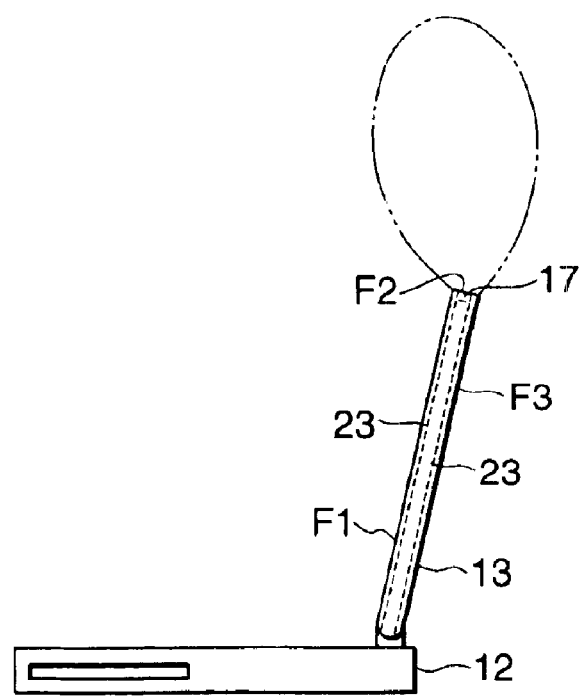
FIG. 14 is an explanatory diagram showing radiation direction of radio wave by an antenna element disposed in an antenna device in other embodiments of the invention.
Figure 15:
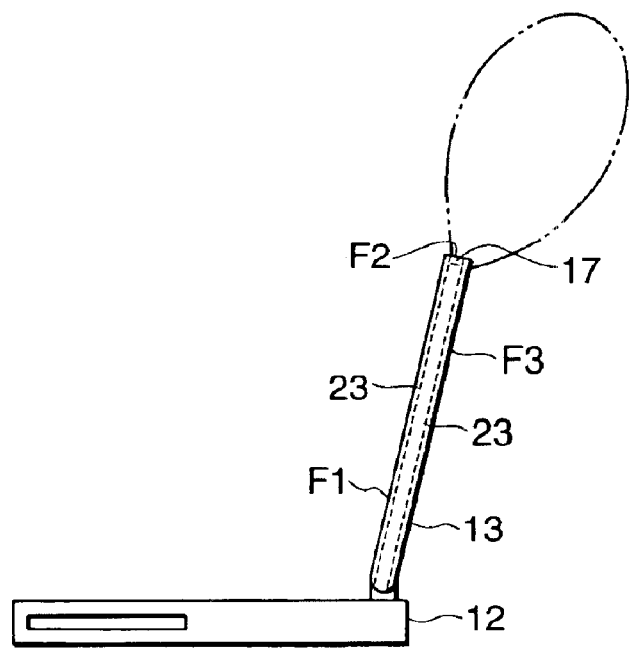
FIG. 15 is an explanatory diagram showing radiation direction of radio wave by an antenna element disposed in an antenna device in a further different embodiment of the invention.
Figure 16:
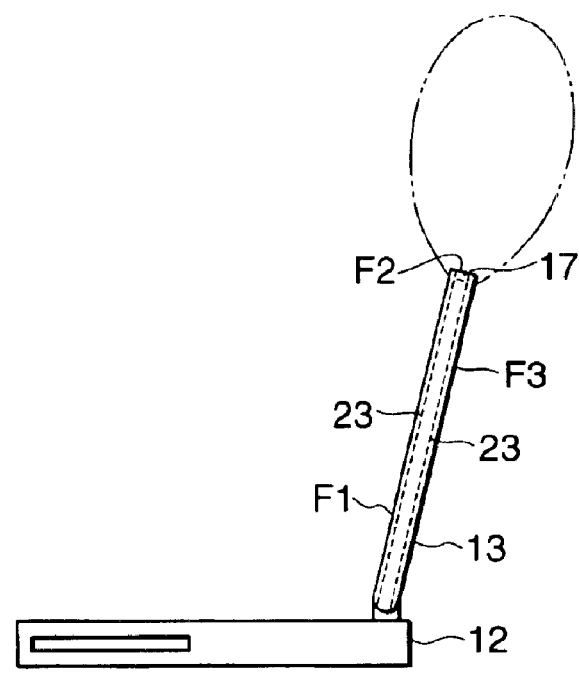
FIG. 16 is an explanatory diagram showing radiation direction of radio wave by an antenna element disposed in an antenna device in a further different embodiment of the invention.
Figure 17:
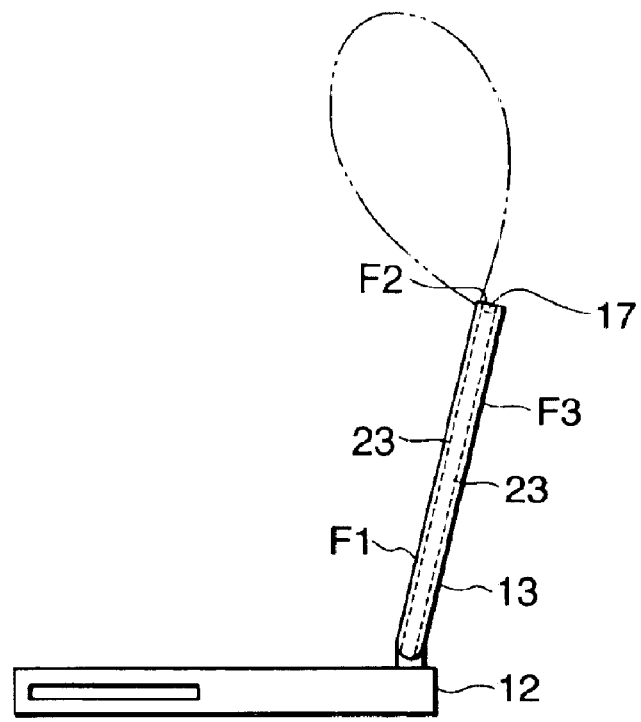
FIG. 17 is an explanatory diagram showing radiation direction of radio wave by an antenna element disposed in an antenna device in a further different embodiment of the invention.
Figure 18:
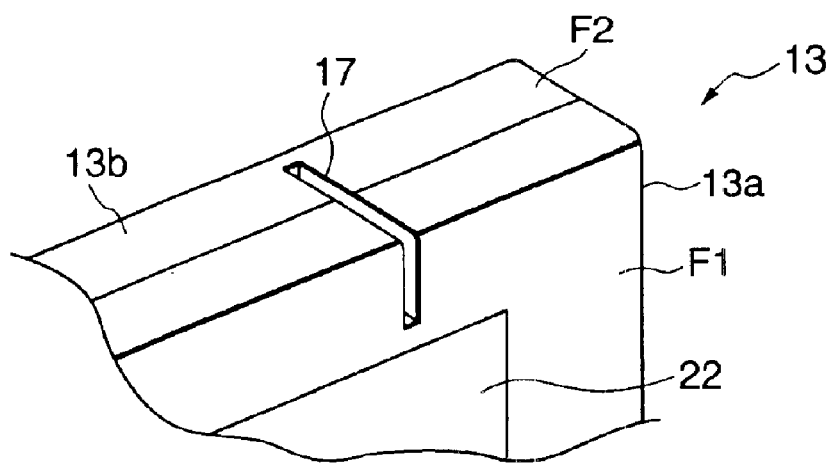
FIG. 18 is a perspective view of an antenna element used in an antenna device in a further different embodiment of the invention.
Figure 19:
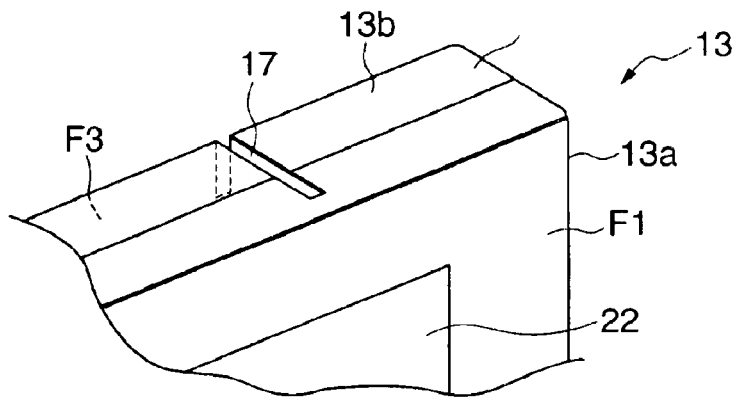
FIG. 19 is a perspective view of an antenna element used in an antenna device in a further different embodiment of the invention.
Figure 20:
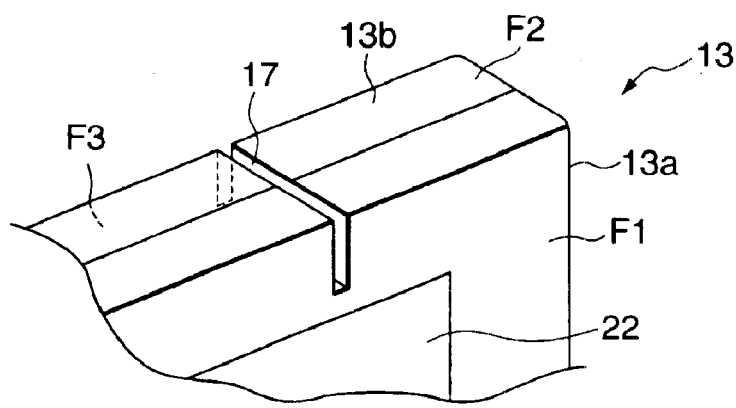
FIG. 20 is a perspective view of an antenna element used in an antenna device in a further different embodiment of the invention.
Figure 21:
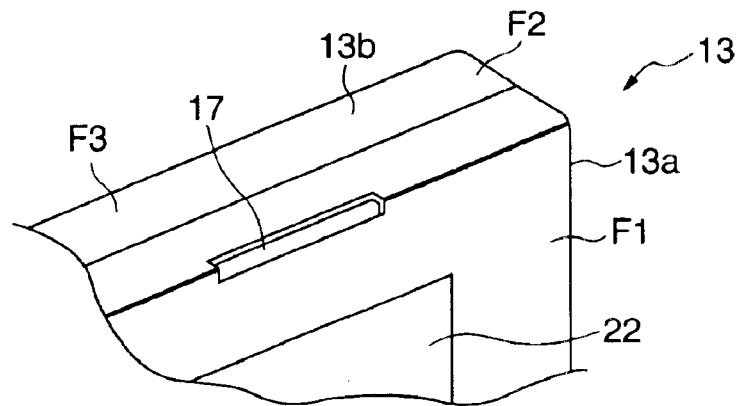
FIG. 21 is a perspective view of an antenna element used in an antenna device in a further different embodiment of the invention.
Figure 22:
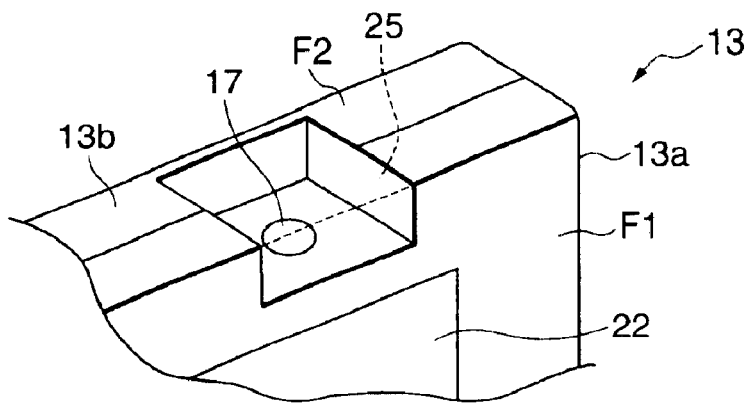
FIG. 22 is a perspective view of an antenna element used in an antenna device in a further different embodiment of the invention.
Figure 23:
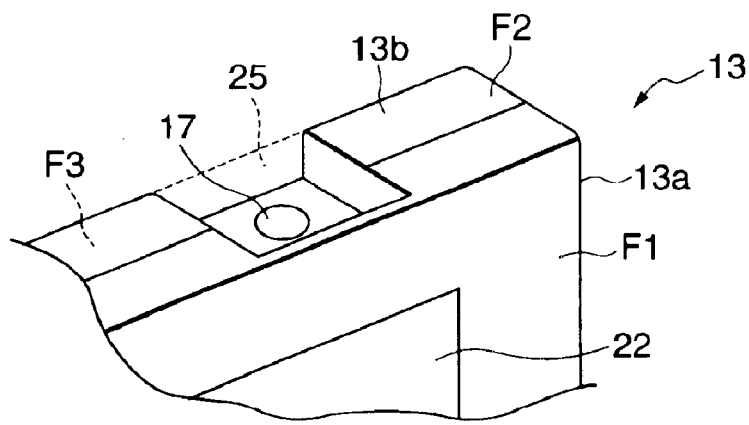
FIG. 23 is a perspective view of an antenna element used in an antenna device in a further different embodiment of the invention.
Figure 24:
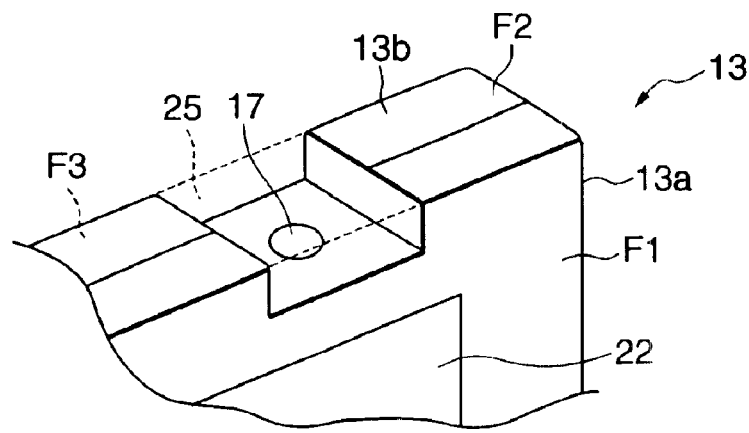
FIG. 24 is a perspective view of an antenna element used in an antenna device in a further different embodiment of the invention.
Figure 25:
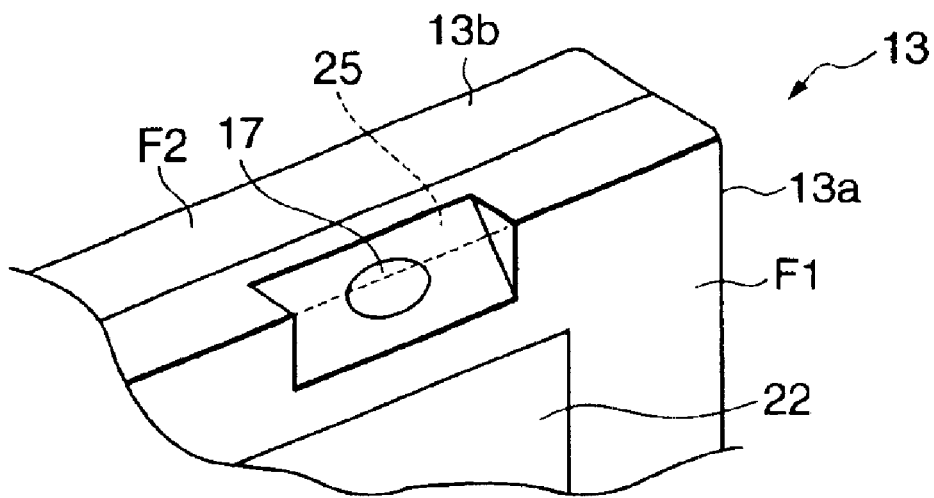
FIG. 25 is a perspective view of an antenna element used in an antenna device in a further different embodiment of the invention.
Figure 26:
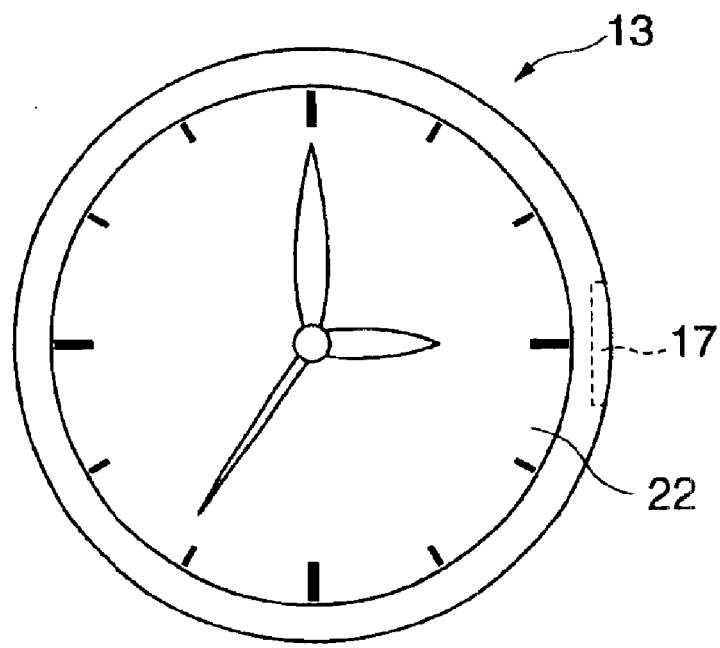
FIG. 26 is a front view showing a display unit in other embodiments of the invention.
Figure 27:
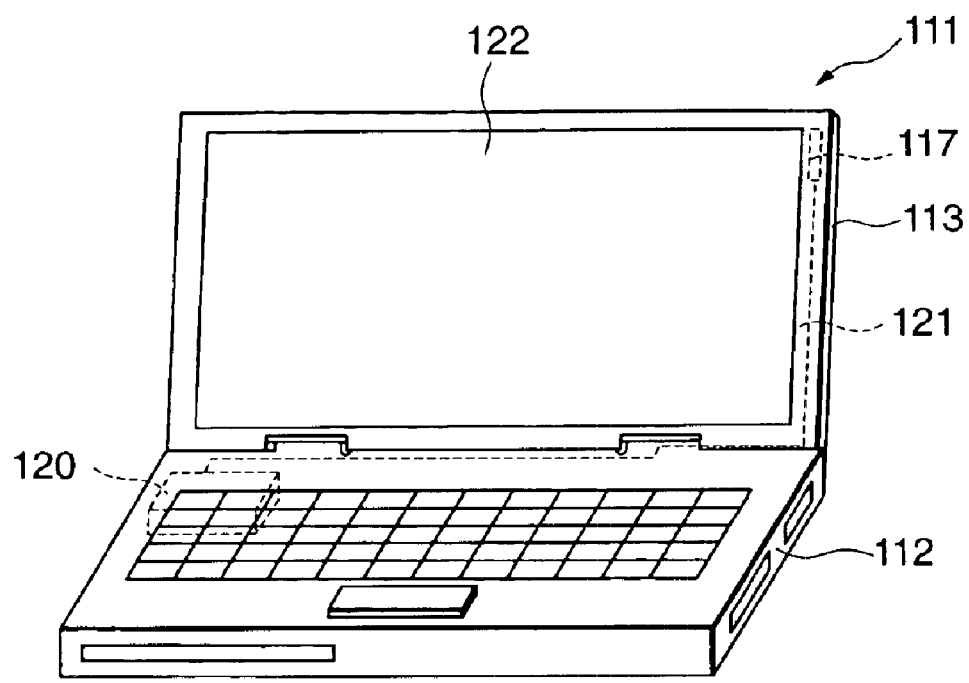
FIG. 27 is a perspective view showing an antenna device disposed in a personal computer in a prior art.
Figure 28:
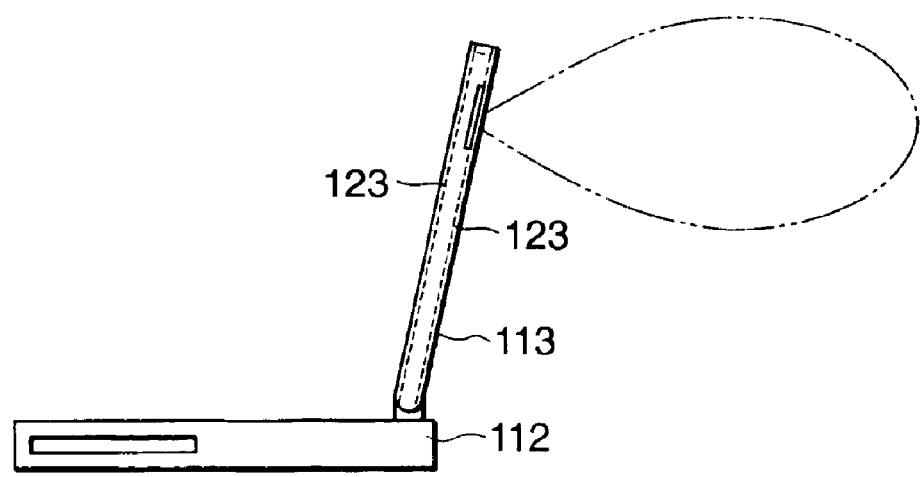
FIG. 28 is an explanatory diagram showing radiation direction of a radio wave by an antenna element disposed in the personal computer in FIG. 27.
Figure 29:
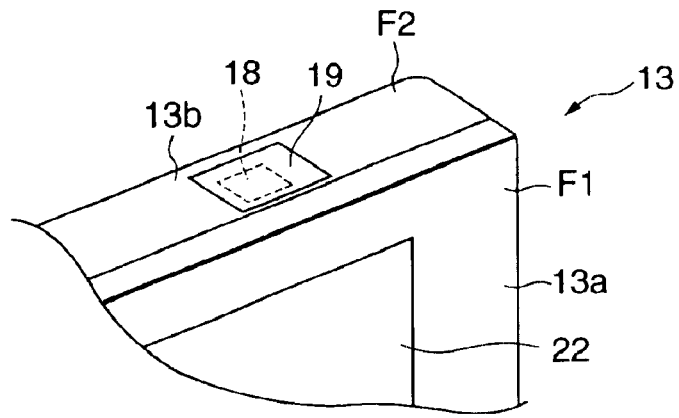
FIG. 29 is a perspective view showing an antenna device having a parasitic element as a further different embodiment of the invention.
Figure 30:
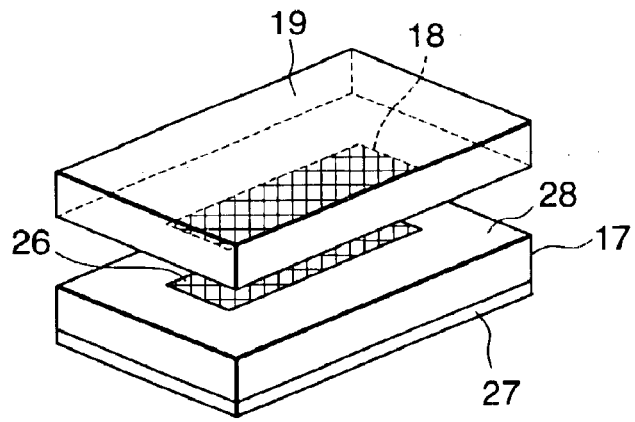
FIG. 30 is a perspective view showing an example of antenna element and parasitic element in the antenna device in FIG. 29.
Figure 31:
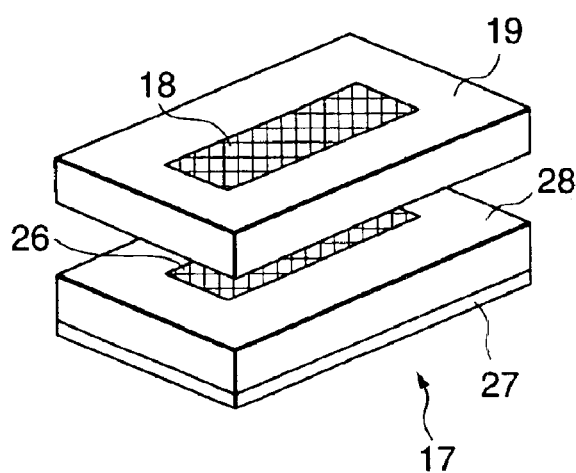
FIG. 31 is a perspective view showing other examples of antenna element and parasitic element in the antenna device in FIG. 29.
Figure 32:
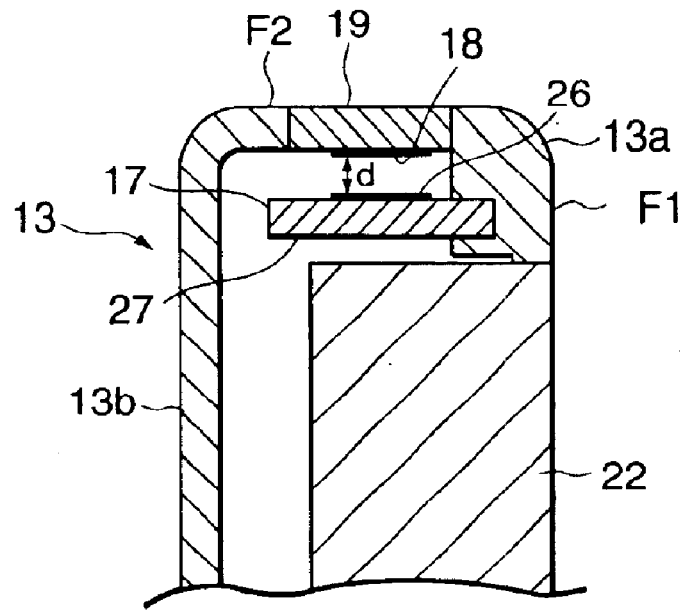
FIG. 32 is a sectional view showing the antenna device having antenna element and parasitic element in FIG. 30.
Figure 33:
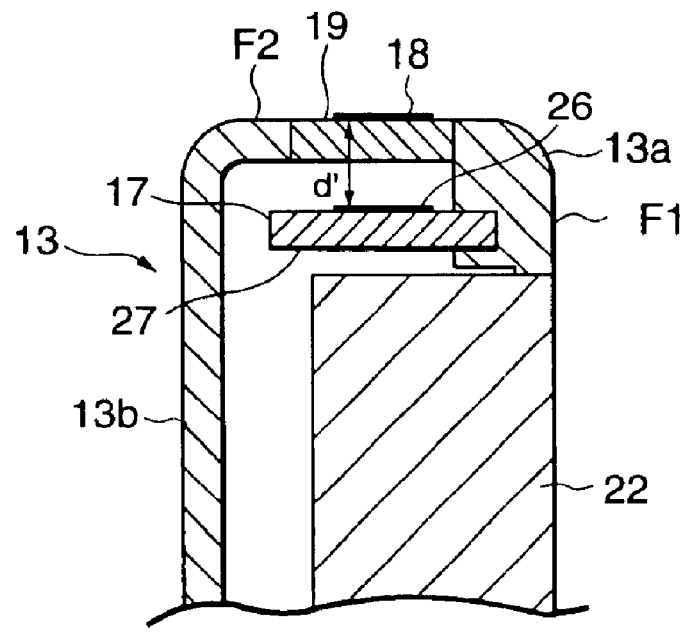
FIG. 33 is a sectional view showing the antenna device having antenna element and parasitic element in FIG. 31.
Figure 34:
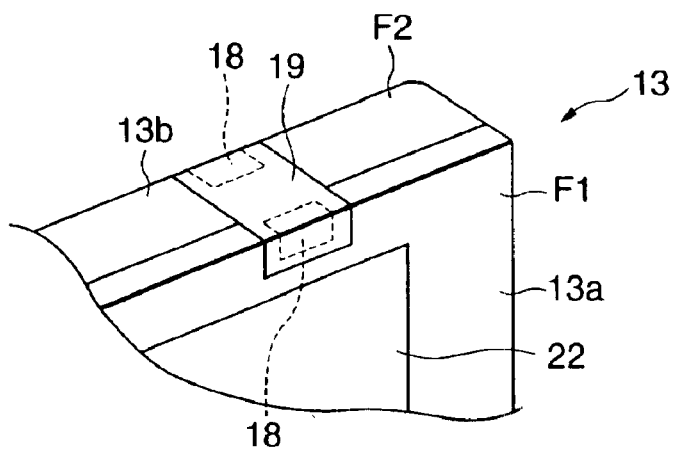
FIG. 34 is a perspective view of antenna device having a parasitic element as a modified example in a further different embodiment of the invention.
Figure 35:
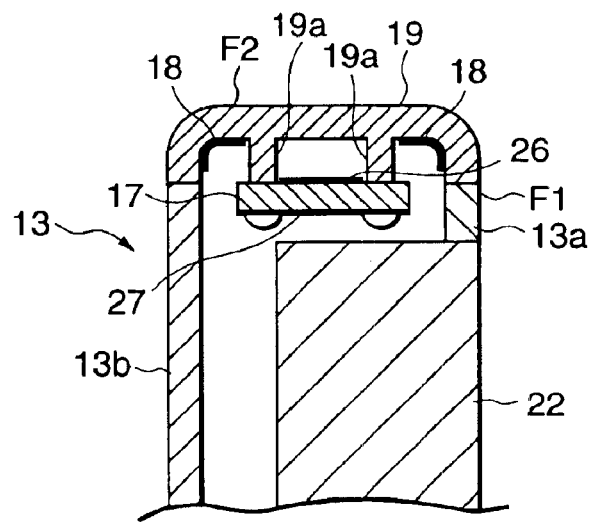
FIG. 35 is a sectional view showing an example of mounting of parasitic element in the antenna device in FIG. 34.
Figure 36:
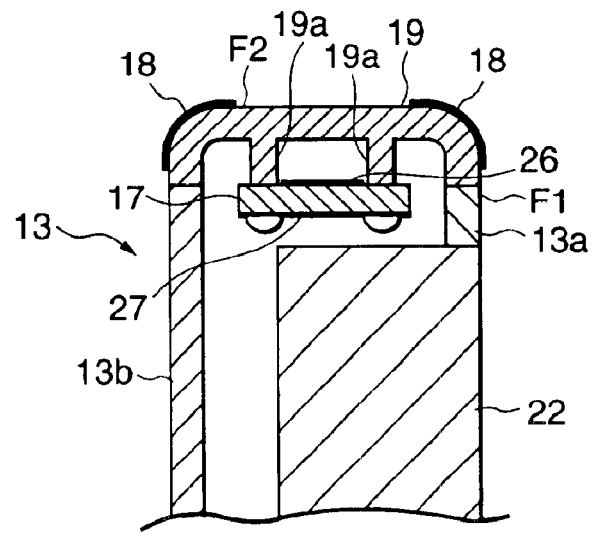
FIG. 36 is a sectional view showing other examples of mounting of parasitic element in the antenna device in FIG. 34.

FIG. 1 is a perspective view showing a personal computer using an antenna device in an embodiment of the invention, FIG. 2 is a perspective view showing essential parts of the antenna device disposed in the personal computer in FIG. 1, FIG. 3 is a sectional view of FIG. 2, FIG. 4 is an explanatory diagram showing radiation direction of a radio wave by an antenna element disposed in the personal computer in FIG. 1, FIG. 5 is a perspective view showing essential parts of an antenna device in other embodiment of the invention, FIG. 6 is a sectional view of FIG. 5, FIG. 7 is a perspective view showing essential parts of an antenna device in a further different embodiment of the invention, FIG. 8 is a sectional view of FIG. 7, FIG. 9 is a sectional view showing essential parts of an antenna device in other different embodiments of the invention, FIG. 10 is a sectional view showing essential parts of an antenna device in a further different embodiment of the invention, FIG. 11 is a perspective view of an antenna element used in an antenna device in a further different embodiment of the invention, FIG. 12 is a sectional view showing essential parts of the antenna device having the antenna element in FIG. 11, FIG. 13 is a perspective view of an antenna element used in an antenna device in a further different embodiment of the invention, FIG. 14 is an explanatory diagram showing radiation direction of radio wave by an antenna element disposed in an antenna device in other embodiments of the invention, FIG. 15 is an explanatory diagram showing radiation direction of radio wave by an antenna element disposed in an antenna device in a further different embodiment of the invention, FIG. 16 is an explanatory diagram showing radiation direction of radio wave by an antenna element disposed in an antenna device in a further different embodiment of the invention, FIG. 17 is an explanatory diagram showing radiation direction of radio wave by an antenna element disposed in an antenna device in a further different embodiment of the invention, FIG. 18 is a perspective view of an antenna element used in an antenna device in a further different embodiment of the invention, FIG. 19 is a perspective view of an antenna element used in an antenna device in a further different embodiment of the invention, FIG. 20 is a perspective view of an antenna element used in an antenna device in a further different embodiment of the invention, FIG. 21 is a perspective view of an antenna element used in an antenna device in a further different embodiment of the invention, FIG. 22 is a perspective view of an antenna element used in an antenna device in a further different embodiment of the invention, FIG. 23 is a perspective view of an antenna element used in an antenna device in a further different embodiment of the invention, FIG. 24 is a perspective view of an antenna element used in an antenna device in a further different embodiment of the invention, FIG. 25 is a perspective view of an antenna element used in an antenna device in a further different embodiment of the invention, FIG. 26 is a front view showing a display unit in other embodiments of the invention, FIG. 29 is a perspective view showing an antenna device having a parasitic element as a further different embodiment of the invention, FIG. 30 is a perspective view showing an example of antenna element and parasitic element in the antenna device in FIG. 29, FIG. 31 is a perspective view showing other examples of antenna element and parasitic element in the antenna device in FIG. 29, FIG. 32 is a sectional view showing the antenna device having antenna element and parasitic element in FIG. 30, FIG. 33 is a sectional view showing the antenna device having antenna element and parasitic element in FIG. 31, FIG. 34 is a perspective view of antenna device having a parasitic element as a modified example in a further different embodiment of the invention, FIG. 35 is a sectional view showing an example of mounting of parasitic element in the antenna device in FIG. 34, and FIG. 36 is a sectional view showing other examples of mounting of parasitic element in the antenna device in FIG. 34.

As shown in FIG. 1, a personal computer (electric appliance) 11 of the embodiment has a wireless communication function, and comprises, for example, two housings of about 2 to 3 millimeters in thickness. The housings consist of a main body side housing 12 including an input unit such as keyboard and accommodating various electric components, and a display side housing 13 disposed in the main body side housing 12 so as to be free to open and close by way of a hinge 14, having a display unit 22 as a liquid crystal display for displaying visual information by electrical means disposed on a principle surface $F_1$. The main body side housing 12 and display side housing 13 may be mutually formed as one body.

The main body side housing 12 is a metal molding, and is provided with an electromagnetic shield for shielding the undesired radiation from the incorporated electric components. The display side housing 13 is composed of a frame side 13a mounted with the display unit 22, and a plate side 13b integrated with the frame side 13a and positioned at the back side of the display unit 22. The frame side 13a is made of resin molding of, for example, acrylonitrile butadiene styrene (ABS) resin, while the plate side 13b is made of metal molding and is provided with electromagnetic shield. The back side of the display unit 22 is plated with a thin metal film.

The electromagnetic shield of the main body side housing 12 and display side housing 13 is not limited to the metal member, but may be realized by resin member containing carbon particles, or resin member coated with thin metal film by plating, painting, vapor deposition, printing or adhering.

As specifically shown in FIG. 2 and FIG. 3, an antenna element 17 composing part of the antenna device of the embodiment is formed at an end face $F_2$ (herein, an end face positioned above the display side housing) adjacent to the principal surface $F_1$ of the display side housing 13, and composes a slot antenna for radiating a radio wave from an opening surrounded by a conductor region shared with the electromagnetic shield of the display side housing 13. By such antenna element 17, a radio wave is radiated from the end face $F_2$.

In the illustrated example, the antenna element 17 is disposed at one position at the end face $F_2$ of the display side housing 13, but a plurality may be also disposed. In the case of a plurality, these antenna elements 17 may be designed to operate mutually in the same frequency band, in mutual different frequency bands, or in plural different frequency bands alone. When formed at one position, it may be designed to operate in a single frequency band only, or in plural frequency bands.

In the shown case, since the opening is formed in the boundary of the frame side 13a and plate side 13b, the conductor region is shared only with the electromagnetic shield of the plate side 13b, and the frame side 13a has a conductive member 24 surrounding the opening. The conductive member 24 may be fitted, for example, by adhering, fusing, melting, screwing, riveting, or crimping. Meanwhile, if the frame side 13a is also shielded electromagnetically, such conductive member 24 is not needed.

Without forming the opening, incidentally, an insulating region may be formed at the position of this opening to compose an antenna element 17. Or when the opening is formed, it is preferred to close the opening with an insulating member to prevent dust from intruding inside.

As shown in FIG. 1, the main body side housing 12 incorporates an RF module unit 20 for supplying an electric power of specified frequency to such antenna element 17 by way of current feeding line 21 of a coaxial cable or micro strip line. The RF module unit 20 may be either incorporated in the display side housing 13, or provided externally.

In the embodiment, the antenna element 17 is disposed at the end face $F_2$ positioned above the display side housing 13, but it may be also formed at the end face $F_2$ positioned sideways. In the case of a plurality of antenna elements 17, they may be disposed at either end face $F_2$ or at all end faces $F_2$. The shape of the display side housing 13 as seen from the display unit side 22 is not limited to the square of the embodiment but may include other shapes (for example, triangle, polygon having five or more facets, circle, star, etc.).

According to the antenna device of the embodiment, as shown in FIG. 4, the radio wave from the antenna device 17 is radiated from the end face $F_2$ of the display side housing 13, and effects of shield by the electromagnetic shield 23 are avoided, and therefore the antenna element 17 incorporated in the display side housing 13 provided with the display unit 22 can be omnidirectional.

In the invention, the antenna element 17 is incorporated in the display side housing 13 so as to radiate the radio wave from the end face $F_2$ of the display side housing 13, and it is not limited to the structure of the antenna element 17 shown in FIG. 2 and FIG. 3. That is, the structure of the antenna element 17 may be employed, for example, as explained below.

In the case of the antenna element 17 of a slot antenna type having only the plate side 13b of the display side housing 13 shielded electromagnetically and sharing with this electromagnetic shield, as shown in FIG. 5 and FIG. 6, only the plate side 13b is formed so that the opening may not cover the frame side 13a, whereby the conductive member 24 shown in FIG. 2 and FIG. 3 is not needed.

Instead of sharing with the electromagnetic shield, as shown in FIG. 7 and FIG. 8, the antenna terminal 17 of slot antenna type independent of the display side housing 13 may be provided. Alternatively, the antenna terminal 17 of slot antenna type may be integrally assembled in the display side housing 13.

When the antenna element 17 is formed independently of the display side housing 13, as shown in FIG. 9, a cover 25 may be provided in the opening and disposed inside of the display side housing 13. When disposed inside of the display side housing 13, as shown in FIG. 10, it may be enclosed in the display side housing 13.

The antenna element 17 is not limited to the slot antenna, but may include also a micro strip antenna as shown in, for example, FIG. 11, formed with a strip 26 at one side of a dielectric substrate 28 and a grounding conductor 27 at the other side. This micro strip antenna may be disposed at the end face $F_2$ of the display side housing 13, or disposed inside of the display side housing 13 by fitting a cover 25 to the opening as shown in FIG. 12.

Further, the antenna element 17 can include an inverted F-type antenna or monopole antenna (not shown) disposed on a conductor plate 29. In the case of such antenna elements 17, it may be designed to be disposed inside of the display side housing 13 by fitting the cover 25 to the opening as shown in FIG. 12.

In the antenna device described so far, the antenna element 17 is disposed at the end face $F_2$ of the display side housing 13 or inside of the display side housing 13, and the radio wave from the antenna element 17 is radiated only from the end face $F_2$ of the display side housing 13 (see FIG. 4). However, the radiation range of radio wave also spreads over the surface other than the end face $F_2$.

That is, the radio wave from the antenna element 17 may be radiated from the end face $F_2$ alone, from the end face $F_2$ and principal surface $F_1$, from the end face $F_2$ and back side (=opposite side of principal surface $F_1$) F3, or from the end face $F_2$, principal surface $F_1$, and back side F3. In other words, the radio wave from the antenna element 17 may be radiated from any surface at least including the end face $F_2$. Or, the radio wave from the antenna element 17 may be radiated from the edge of the end face $F_2$.

FIG. 14 shows the state of the radio wave from the antenna element 17 radiated from the end face $F_2$ and principal surface $F_1$, FIG. 15 shows the state radiated from the end face $F_2$ and back side F3, FIG. 16 shows the state radiated from the end face $F_2$, principal surface $F_1$ and back side F3, and FIG. 17 shows the state radiated from edge of the end face $F_2$.

The mode of mounting of the antenna element 17 radiating the radio wave in these manners will be explained below.

In the case of the antenna element 17 of slot antenna type, as shown in FIG. 18, an opening or insulating region is formed over two surfaces of the end face $F_2$ and principal surface $F_1$, and the radio wave from the antenna element 17 is radiated from the end face $F_2$ and principal surface $F_1$ (FIG. 14). As shown in FIG. 19, when an opening or insulating region is formed over two surfaces of the end face $F_2$ and back side F3, the radio wave from the antenna element 17 is radiated from the end face $F_2$ and back side F3 (FIG. 15). As shown in FIG. 20, when an opening or insulating region is formed over three surfaces of the end face $F_2$, principal surface $F_1$ and back side F3, the radio wave from the antenna element 17 is radiated from the end face $F_2$, principal surface $F_1$ and back side F3 (FIG. 16). As shown in FIG. 21, when an opening or insulating region is formed at the edge of the end face $F_2$, the radio wave from the antenna element 17 is radiated from the edge of the end face $F_2$ (FIG. 17).

In the cases shown in FIG. 18 to FIG. 21, the conductor region enclosing the opening or insulating region may be shared with the electromagnetic shield, or may be composed of an independent metal. The opening may be closed by an insulating member. When the slot antenna is disposed inside of the display side housing 13, by adjusting the direction of the opening or insulating region of the antenna, radiation modes of radio waves as shown in FIG. 14 to FIG. 17 may be obtained.

In the case of the antenna element 17 of micro strip antenna type, when a strip 26 is disposed over two surfaces of the end face $F_2$ and principal surface $F_1$, and the radio wave from the antenna element 17 is radiated from the end face $F_2$ and principal surface $F_1$ (FIG. 14). When a strip 26 is formed over two surfaces of the end face $F_2$ and back side F3, the radio wave from the antenna element 17 is radiated from the end face $F_2$ and back side F3 (FIG. 15). When a strip 26 is formed over three surfaces of the end face $F_2$, principal surface $F_1$ and back side F3, the radio wave from the antenna element 17 is radiated from the end face $F_2$, principal surface $F_1$ and back side F3 (FIG. 16). When a strip 26 is formed at the edge of the end face $F_2$, the radio wave from the antenna element 17 is radiated from the edge of the end face $F_2$ (FIG. 17). Herein, too, when the micro strip antenna is disposed inside of the display side housing 13, by adjusting the direction of the strip 26 of the antenna, radiation modes of radio waves as shown in FIG. 14 to FIG. 17 may be obtained.

In the case of the antenna element 17 of inverted F-type antenna or monopole antenna type, when an opening is formed over two surfaces of the end face $F_2$ and principal surface $F_1$ as shown in FIG. 22, and the radio wave from the antenna element 17 is radiated from the end face $F_2$ and principal surface $F_1$ (FIG. 14). As shown in FIG. 23, when an opening is formed over two surfaces of the end face $F_2$ and back side F3, the radio wave from the antenna element 17 is radiated from the end face $F_2$ and back side F3 (FIG. 15). As shown in FIG. 24, when an opening is formed over three surfaces of the end face $F_2$, principal surface $F_1$ and back side F3, the radio wave from the antenna element 17 is radiated from the end face $F_2$, principal surface $F_1$ and back side F3 (FIG. 16). As shown in FIG. 25, when an opening is formed at the edge of the end face $F_2$, the radio wave from the antenna element 17 is radiated from the edge of the end face $F_2$ (FIG. 17).

In these cases, a cover 25 may be attached to the opening.

When the micro strip antenna (FIG. 11) is used as the antenna element 17, in order to improve the radiation characteristic of the strip 26 which is a radiating element or realize broadband or multiband, an antenna element not provided with power source, that is, a parasitic element 18 may be disposed as shown in FIG. 29.

The parasitic element 18 is a metal conductor formed at one side of a dielectric substrate 19, and is disposed at the forming side of the strip 26 in the antenna element 17 as shown in FIG. 30 and FIG. 31. The parasitic element 18 may be disposed either as shown in FIG. 30, in which the forming side of the parasitic element 18 in the dielectric substrate 19 may be opposite to the strip 26, or as shown in FIG. 31, in which the non-forming side of the parasitic element 18 in the dielectric substrate 19 may be opposite to the strip 26.

FIG. 32 is a sectional view of the parasitic element 18 in configuration shown in FIG. 30 assembled in the display side housing 13, and FIG. 33 is a sectional view of the parasitic element 18 in configuration shown in FIG. 31 assembled in the display side housing 13.

In these drawings, the antenna element 17 is enclosed and fixed at the frame side 13a, and in FIG. 31 the dielectric substrate 19 is used as a cover of part of the display side housing 13 and the parasitic element 18 is disposed along the inner side. In FIG. 33, similarly, the dielectric substrate 19 is used as a cover of part of the display side housing 13 and the parasitic element 18 is disposed along the outer side. Further, by adjusting the gap d (FIG. 32), d' (FIG. 33) between the strip 26 and the parasitic element 18, broadband or multiband antenna element 17 may be realized or radiation characteristic may be improved, and desired properties maybe obtained.

As shown in FIG. 34, the parasitic element 18 may be disposed at plural positions (two positions in the illustrated example). That is, the dielectric substrate 19 is used as cover of the display side housing 13, and the parasitic element 18 can be disposed at the forming side of the strip 26, along the inner edge as shown in FIG. 35 or along the outer edge as shown in FIG. 36. In these illustrated cases, a spacer 19a is formed to extend to the inner side of the dielectric substrate 19, and the antenna element 17 is fixed with screw to the leading end of the spacer 19a to support it. However, the parasitic element 18 may be disposed at the position other than the edge.

In FIG. 29 to FIG. 36, the dielectric substrate 19 serves also as the cover, but they may be also formed separately. Besides, the parasitic element 18 may be formed integrally with the display side housing 13. When formed integrally, the manufacture is easier, the number of assembling steps is saved, and the appearance is improved.

In the foregoing embodiments, a liquid crystal display is used as the display unit 22 for displaying visual information, but it may be replaced by other electrical display means other than liquid crystal display. Or, instead of electrical means, the visual information may be also displayed by mechanical display means such as clock as shown in FIG. 26.

In the foregoing embodiments, the antenna device of the invention is applied in the personal computer 11 as one of the electric appliances, but the antenna device of the invention may be applied to various electric appliances such as information appliance and electric household appliance (for example, PDA, mobile telephone, liquid crystal display, VTR, digital camera, cordless telephone, facsimile apparatus, video game machine, printer, scanner, and audio appliances) as well as the personal computer.

As clear from the description so far, the invention brings about the following effects.

Since effects of shield by electromagnetic shield are avoided by radiating the radio wave from the surface including the end face of the housing or the edge of the end face, the antenna element incorporated in the housing provided with the display unit can be omnidirectional.

What is claimed is:

1. An antenna device, comprising:
   a housing for allowing a display unit for displaying visual information to be disposed on a principal surface, said housing incorporating an electromagnetic shielding component; and
   an antenna element incorporated in the housing for radiating a radio wave from a surface including at least one of an end face contacting with the principal surface of the housing and an edge of the end face.

2. The antenna device as claimed in claim 1, wherein the antenna element radiates the radio wave from the surface including at least either the end face positioned above the housing or the end face positioned sideways, or the edge of the end face of at least either the end face positioned above the housing or the end face positioned sideways.

3. The antenna device as claimed in claim 2, wherein the antenna element comprises a slot antenna for radiating a radio wave from an opening or insulating region formed in the surface including the end face of the housing surrounded by a conductor region or the edge of the end face.

4. The antenna device as claimed in claim 3, wherein the conductor region is shared with an electromagnetic shield region of the housing for shielding undesired radiation from electronic circuits.

5. The antenna device as claimed in claim 4, wherein the opening is closed by an insulating member.

6. The antenna device as claimed in claim 3, wherein the opening is closed by an insulating member.

7. The antenna device as claimed in claim 2, wherein the antenna element comprises a slot antenna installed inside of the housing.

8. The antenna device as claimed in claim 2, wherein the antenna element comprises a micro strip antenna, installed in the surface including the end face of the housing, the edge of the end face or the inside of the housing, including a strip formed at one side of a dielectric substrate and a grounding conductor at the other side.

9. The antenna device as claimed in claim 8, wherein a parasitic element is disposed at the strip forming side of the antenna element.

10. The antenna device as claimed in claim 9, wherein the parasitic element is disposed along the inside or outside of the housing.

11. The antenna device as claimed in claim 2, wherein the antenna element comprises one of an inverted F-type antenna and a monopole antenna installed inside of the housing.

12. The antenna device as claimed in claim 1, wherein the antenna element comprises a slot antenna for radiating a radio wave from an opening or insulating region formed in the surface including the end face of the housing surrounded by a conductor region or the edge of the end face.

13. The antenna device as claimed in claim 12, wherein the conductor region is shared with an electromagnetic shield region of the housing for shielding undesired radiation from electronic circuits.

14. The antenna device as claimed in claim 13, wherein the opening is closed by an insulating member.

15. The antenna device as claimed in claim 12, wherein the opening is closed by an insulating member.

16. The antenna device as claimed in claim 1, wherein the antenna element comprises a slot antenna installed inside of the housing.

17. The antenna device as claimed in claim 1, wherein the antenna element comprises a micro strip antenna, installed in the surface including the end face of the housing, the edge of the end face or the inside of the housing, including a strip formed at one side of a dielectric substrate and a grounding conductor at the other side.

18. The antenna device as claimed in claim 17, wherein a parasitic element is disposed at the strip forming side of the antenna element.

19. The antenna device as claimed in claim 18, wherein the parasitic element is disposed along the inside or outside of the housing.

20. The antenna device as claimed in claim 1, wherein the antenna element comprises one of an inverted F-type antenna and a monopole antenna installed inside of the housing.

21. An electronic appliance comprising an antenna device as claimed in claim 1, further comprising:
a current feeding unit for feeding an electric power of specified frequency to the antenna element.

22. The antenna device of claim 1, wherein said incorporated antenna maintains an omnidirectional antenna characteristic.

23. The antenna device of claim 1, wherein said incorporated antenna comprises a surface-mounted antenna mounted onto an inside surface of said housing.

24. The antenna device of claim 23, wherein said surface-mounted antenna comprises a slot antenna.

25. The antenna device of claim 23, wherein said surface-mounted antenna comprises a microstrip antenna.

26. The antenna device of claim 23, wherein said surface-mounted antenna comprises an inverted F-type antenna.

27. The antenna device of claim 23, wherein said surface-mounted antenna comprises a monopole antenna mounted on a conductor plate.

28. An electronic apparatus, comprising:
a housing that incorporates an electromagnetic shielding component; and
an antenna element incorporated as a component in said apparatus, wherein said electromagnetic shielding component serves as a component for said antenna element to provide an omnidirectional antenna characteristic.

29. The electronic apparatus of claim 28, wherein said apparatus comprises a computer.

30. The electronic apparatus of claim 28, wherein said apparatus is portable.

31. The electronic apparatus of claim 28, wherein said antenna comprises one of:
a slot antenna;
a micro strip antenna;
an inverted F-type antenna; and
a monopole antenna.

32. The electronic apparatus of claim 28, wherein said antenna has a radiation opening formed therein and a dielectric cover for said opening.

33. The electronic apparatus of claim 28, wherein said antenna includes at least one parasitic element.

34. An electronic apparatus having a display panel, said display panel comprising:
a display unit;
a housing allowing said display unit to be disposed as a principal surface thereof, said housing incorporating at least one section of conductive material on at least one end face contacting said principal surface; and
an antenna element integrated into said housing for radiating a radio wave from a surface including at least one of said end face and an edge of said end face, wherein said antenna radiates through an opening surrounded by conductive material of one or more said at least one section of conductive material.

35. The electronic apparatus of claim 34, wherein one of said at least one section of conductive material comprises an electromagnetic shielding component for said display panel.

36. The electronic apparatus of claim 34, wherein said apparatus comprises a computer.

37. The electronic apparatus of claim 34, wherein said apparatus is portable.

38. The electronic apparatus of claim 34, wherein said antenna comprises one of:
a slot antenna;
a micro strip antenna;
an inverted F-type antenna; and
a monopole antenna.

39. The electronic apparatus of claim 34, wherein said antenna has a radiation opening formed therein and a dielectric cover for said opening.

40. The electronic apparatus of claim 34, wherein said antenna includes at least one parasitic element.

* * * * *